US007565615B2

(12) United States Patent
Ebert

(10) Patent No.: US 7,565,615 B2
(45) Date of Patent: Jul. 21, 2009

(54) SURVEY GENERATION SYSTEM

(75) Inventor: Peter S Ebert, Menlo Park, CA (US)

(73) Assignee: SAP Aktiengesellschaft, Walldorf (DE)

( * ) Notice: Subject to any disclaimer, the term of this patent is extended or adjusted under 35 U.S.C. 154(b) by 839 days.

(21) Appl. No.: 11/041,879

(22) Filed: Jan. 25, 2005

(65) Prior Publication Data
US 2005/0193333 A1 Sep. 1, 2005

Related U.S. Application Data

(63) Continuation-in-part of application No. 10/963,788, filed on Oct. 14, 2004, and a continuation-in-part of application No. 10/880,512, filed on Jul. 1, 2004.

(60) Provisional application No. 60/570,139, filed on May 12, 2004, provisional application No. 60/548,097, filed on Feb. 27, 2004.

(51) Int. Cl.
*G06F 3/00* (2006.01)
(52) U.S. Cl. ................ 715/762; 715/769; 715/760; 705/7; 705/10
(58) Field of Classification Search ................ 715/762, 715/760, 763, 769; 705/7, 10
See application file for complete search history.

(56) References Cited

U.S. PATENT DOCUMENTS

| | | | |
|---|---|---|---|
| 5,537,618 A * | 7/1996 | Boulton et al. ............... | 715/745 |
| 5,893,098 A * | 4/1999 | Peters et al. .................. | 707/10 |
| 6,134,531 A | 10/2000 | Trewitt et al. | |
| 6,189,029 B1 * | 2/2001 | Fuerst ......................... | 709/217 |
| 6,260,064 B1 | 7/2001 | Kurzrok | |
| 6,421,724 B1 | 7/2002 | Nickerson et al. | |
| 6,477,504 B1 * | 11/2002 | Hamlin et al. ................. | 705/10 |
| 6,581,071 B1 * | 6/2003 | Gustman et al. ........... | 707/104.1 |
| 6,606,581 B1 | 8/2003 | Nickerson et al. | |
| 6,618,746 B2 * | 9/2003 | Desai et al. .................. | 709/204 |
| 6,874,125 B1 | 3/2005 | Carroll et al. | |

(Continued)

OTHER PUBLICATIONS

3M, "Post-it® Software Notes: Overview," undated materials, copyright 2003, [online], [retrieved from the Internet on May 7, 2004: http://www.3m.com/market/office/postit/com_prod/psnotes/index.html], 3 pgs.

(Continued)

*Primary Examiner*—Weilun Lo
*Assistant Examiner*—Tuyetlien T Tran
(74) *Attorney, Agent, or Firm*—Fish & Richardson P.C.

(57) ABSTRACT

A survey generation system is described that allows a survey designer to design and implement a survey for obtaining feedback from participants of the survey. Survey components are displayed within a first portion of a user interface, where each survey component is associated with a type of survey question. The survey designer may select one or more of the survey components by "dragging and dropping" the selected survey component to a second portion of the user interface, where the survey generation system automatically creates an editable instance of the selected survey component and corresponding question type. The survey designer may enter a desired question, and associated answer choices, if any. In this way, the survey designer designs the survey in an easy, fast, and intuitive manner, and, in particular, views the survey as it will appear to the participant, even during the design of the survey.

11 Claims, 12 Drawing Sheets

U.S. PATENT DOCUMENTS

| | | | |
|---|---|---|---|
| 7,313,621 | B2 | 12/2007 | Gudorf et al. |
| 2002/0016848 | A1 | 2/2002 | Yoshimine et al. |
| 2002/0129052 | A1* | 9/2002 | Glazer et al. ............. 707/501.1 |
| 2002/0169782 | A1 | 11/2002 | Lehmann et al. |
| 2003/0001887 | A1 | 1/2003 | Smith, IV |
| 2003/0005465 | A1 | 1/2003 | Connelly |
| 2003/0050994 | A1 | 3/2003 | Pollack |
| 2003/0152904 | A1* | 8/2003 | Doty, Jr. ..................... 434/350 |
| 2004/0019688 | A1 | 1/2004 | Nickerson et al. |
| 2004/0049534 | A1 | 3/2004 | Nickerson et al. |
| 2004/0128183 | A1* | 7/2004 | Challey et al. ................ 705/10 |
| 2004/0176992 | A1 | 9/2004 | Santos et al. |
| 2004/0189716 | A1* | 9/2004 | Paoli et al. .................. 345/853 |
| 2004/0260781 | A1 | 12/2004 | Shostack et al. |
| 2005/0114366 | A1 | 5/2005 | Mathai et al. |

OTHER PUBLICATIONS

Eight Days, Inc., "Hot or Not," undated materials, copyright 2000-2004, [online], [retrieved from the Internet on May 7, 2004: http://www.hotornot.com/], 4 pgs.

Gadwin Systems, Inc., "Diagram Studio," undated materials, [online], [retrieved from the Internet on May 10, 2004: http://www.gadwin.com/products.htm], 2 pgs.

Gadwin Systems, Inc., "Gadwin PrintScreen," undated materials, [online], [retrieved from the Internet on May 10, 2004: http://www.gadwin.com/printscreen/], 2 pgs.

Microsoft Corporation, "The Customer Experience Improvement Program: Continuing Software Improvement at Microsoft," undated materials, copyright 2000, [online], [retrieved from the Internet Jan. 9, 2004: http://www.microsoft.com/products/ceip/english/default.htm], 3 pgs.

OpinionLab OnlineOpinion Web user feedback system, "A proven system to monitor and improve the online user experience based on continuously listening to visitors across your entire website," reprinted from http://www.opinionlab.com/ printed on Jan. 9, 2004 (1 page).

OpinionLab, Inc., "OpinionLab OnlineOpinion Web User Feedback System: More About OnlineOpinion," undated materials, copyright 2004, [online], [retrieved from the Internet Jan. 7, 2004: http://www.opinionlab.com/more_about_oo.asp], 2 pgs.

OpinionLab, Inc., "The OnlineOpinion System: Different From Other Feedback Techniques," undated materials, copyright 2002, [online], [retrieved from the Internet Jan. 9, 2004: http://www.opinionlab.com/PDF/OnlineOpinion_Different_from_Others.pdf], 3 pgs.

* cited by examiner

600

```xml
<?xml version="1.0" encoding="UTF-8" ?>
- <survey rendererURL="stdrenderer">
    <component caption="Please input a question or statement here..." high="5" id="5"
        leftCaption="Not well at all" low="1" rightCaption="Very well" type="rate" />
    <component caption="Please input a question or statement here..." high="7" id="6"
        leftCaption="Not well at all" low="1" rightCaption="Very well" type="rate" />
    <component caption="Please input a question or statement here..." id="7"
        type="freeText" />
  - <component caption="Please input a question or statement here..." id="8"
        type="singleOption">
        <option caption="Option 1" id="1" />
        <option caption="Option 2" id="2" />
        <option caption="Option 3" id="3" />
        <option caption="Option 4" id="4" />
    </component>
  - <component caption="Please input a question or statement here..." id="9"
        type="multipleOption">
        <option caption="Option 1" id="1" />
        <option caption="Option 3" id="2" />
        <option caption="Option 3" id="3" />
    </component>
</survey>
```

```xml
<?xml version="1.0" encoding="UTF-8" ?>
- <survey rendererURL="stdrenderer">
  - <component caption="Would you be interested in joining an EFS community, e.g. for exchanging
      best practices, share ideas, and discuss feature requests?" id="12" type="singleOption">
      <option caption="Yes" id="1" />
      <option caption="No" id="2" />
    </component>
    <component caption="What are your top three pain areas using EFS?" id="13" type="freeText" />
    <component caption="What are your top three benefits using EFS?" id="14" type="freeText" />
  - <component caption="How many feedback campaigns have you run so far?" id="15"
      type="singleOption">
      <option caption="less than 3" id="1" />
      <option caption="3 - 5" id="2" />
      <option caption="10 and more" id="3" />
    </component>
  </survey>
```

8. Would you be interested in joining an EFS community, e.g. for exchanging best practices, share ideas, and discuss feature requests?
○ Yes
○ No                                                                    ~702

9. What are your top three pain areas using EFS?
[                          ]
                                                                        ~704

10. What are your top three benefits using EFS?
[                          ]
                                                                        ~706

11. How many feedback campaigns have you run so far?
○ less than 3
○ 3 - 5
○ 10 and more                   ~708
[Submit] Privacy  ~902

FIG. 9

SURVEY GENERATION SYSTEM

CROSS-REFERENCE TO RELATED APPLICATIONS

Under 35 U.S.C. §120, this application is a continuation-in-part of U.S. application Ser. No. 10/963,788, filed Oct. 14, 2004, and titled "FEEDBACK SYSTEM FOR VISUAL CONTENT WITH ENHANCED NAVIGATION FEATURES," and is a continuation-in-part of U.S. application Ser. No. 10/880,512, filed Jul. 1, 2004, and titled, "FEEDBACK SYSTEM FOR VISUAL CONTENT. Under 35 U.S.C. 119(e), this application claims priority to U.S. Provisional Application No. 60/570,139, filed May 12, 2004, and titled, "FEEDBACK SYSTEM FOR VISUAL CONTENT WITH ENHANCED NAVIGATION FEATURES," and to U.S. Provisional Application No. 60/548,097, filed Feb. 27, 2004, titled "FEEDBACK SYSTEM FOR VISUAL CONTENT."

TECHNICAL FIELD

This description relates to generating surveys.

BACKGROUND

Surveys provide techniques for obtaining feedback or other information from recipients in a targeted and useful manner. Surveys may include, for example, multiple-choice questions, true/false type questions, ranking scales for indicating a degree of preference (or lack thereof), and open-ended questions. In the past, surveys were only distributed by paper questionnaires, for collection and compilation by hand or by automated compilation machines.

Computerized and on-line surveys provide a convenient way to obtain feedback from a large number of users, and may facilitate the compilation of survey results. However, it may be difficult for a user to create and distribute such surveys. In particular, for example, it may be difficult for a user to design a survey having a desired combination of the above (or other) question types, or having a desired appearance. As another example, it may be difficult for a user to include a survey within a separate application, thereby limiting a usefulness of the survey.

SUMMARY

According to one general aspect, a system includes a survey component generator operable to provide survey components for display within a designer view of a user interface for selection by a survey designer, and further operable to generate an editable instance of each of a plurality of selected ones of the survey components, for display and editing within a participant view of the user interface, and a survey assembler operable to receive edited instances of the plurality of selected survey components displayed in the participant view of the user interface, for assembly into a survey for output to a survey participant.

Implementations may include one or more of the following features. For example, the designer view of the survey components and the participant view of at least some of the editable or edited instances of the selected survey components may be displayed to the survey designer simultaneously during a designing of the survey.

The survey components may include drag-and-drop elements displayed within the designer view and the editable instances include dragged-and-dropped instances of one or more of the survey components within the participant view. Each of the survey components may be identified within the designer view as corresponding to a survey question type, and the editable survey components may include an editable question or answer field that corresponds to the survey question type.

The system may include a results compiler that may be operable to receive survey input from a plurality of survey participants for aggregation of the survey input. The survey component generator may be operable to generate the survey components as extensible Mark-up Language (XML) components, and the survey assembler may be operable to assemble, save, and output the survey as an XML document.

The participant view may include a first screen of editable or edited instances of the selected survey components, and a second screen of editable or edited instances of the selected survey components. In this case, the first screen may display a first index marker and the second screen may display a second index marker. Further, the designer view may include a first save function for saving the first screen and the second screen individually, and a second save function for saving the survey, such that the survey assembler may be operable to assemble the first screen and the second screen into the survey in response to selection of the second save function by the survey designer.

The system also may include an integrator for supplying the survey to an external application, such that the survey may be supplied to users of the external application.

According to another general aspect, a plurality of survey components are displayed within a first portion of a user interface. A selection of at least some of the survey components by a survey designer is received, and editable instances of the selected survey components are displayed within a second portion of the user interface. Edits to the editable instances of the selected survey components are received to obtain edited instances of the selected survey components, while the plurality of survey components are displayed within the first portion of the user interface.

Implementations may include one or more of the following features. For example, receiving the selection and displaying editable instances may include providing a drag-and-drop functionality for the survey components such that the editable instances include dragged-and-dropped instances of one or more of the survey components. In this case, the edited instances of the survey components may be aggregated into a survey.

Further, the edited instances of the survey components may be identified as a first indexed set of edited instances of the survey components, the first indexed set may be removed from the second portion of the user interface, and additional editable instances of further-selected survey components may be displayed within the second portion of the user interface. Edits to the additional editable instances of the further-selected survey components may be received, to obtain additional edited instances of the further-selected survey components, while displaying the plurality of survey components within the first portion of the user interface, and the additional edited instances of the further-selected survey components may be identified as a second indexed set of edited instances of the survey components.

Further, the first indexed set and the second indexed set may be included within the survey, and the survey may be output to a survey participant for viewing according to the first indexed set and the second indexed set. Additionally, or alternatively, the survey may be output to a user-feedback application, such that the survey designer may include the survey within a user-feedback campaign.

According to another general aspect, a user interface includes a first portion for displaying survey components that are each associated with a type of survey question, and a second portion for displaying editable instances of selected ones of the survey components for editing by a survey designer, to thereby obtain a plurality of survey questions, while the first portion is displaying the survey components. The editable instances are supplied and placed within the second portion by way of a dragging-and-dropping of the selected ones of the survey components between the first portion and the second portion.

Implementations may include one or more of the following features. For example, the second portion may display one set of a plurality of sets of the survey questions at a time, and the plurality of sets may be indexed for selection by the survey designer or by a participant of the survey questions.

The first portion may include a first save function for saving the sets of the survey questions, and a second save function for saving the survey questions in their entirety. The second portion may include an index identifier that identifies a currently-viewed set of the sets of the survey questions, and that allows navigation between the sets of the survey questions.

The details of one or more implementations are set forth in the accompanying drawings and the description below. Other features will be apparent from the description and drawings, and from the claims.

DESCRIPTION OF DRAWINGS

FIG. 6 is a screenshot of a coded document for displaying the survey of FIGS. 3-5.

FIG. 7 is a screenshot seen by a survey designer while designing a second survey using the survey generation system of FIG. 1.

FIG. 8 is a screenshot of a coded document for displaying the survey of FIG. 7.

FIG. 9 seen by a survey participant who receives the survey of FIG. 7 for completion.

DETAILED DESCRIPTION

Figure 1:
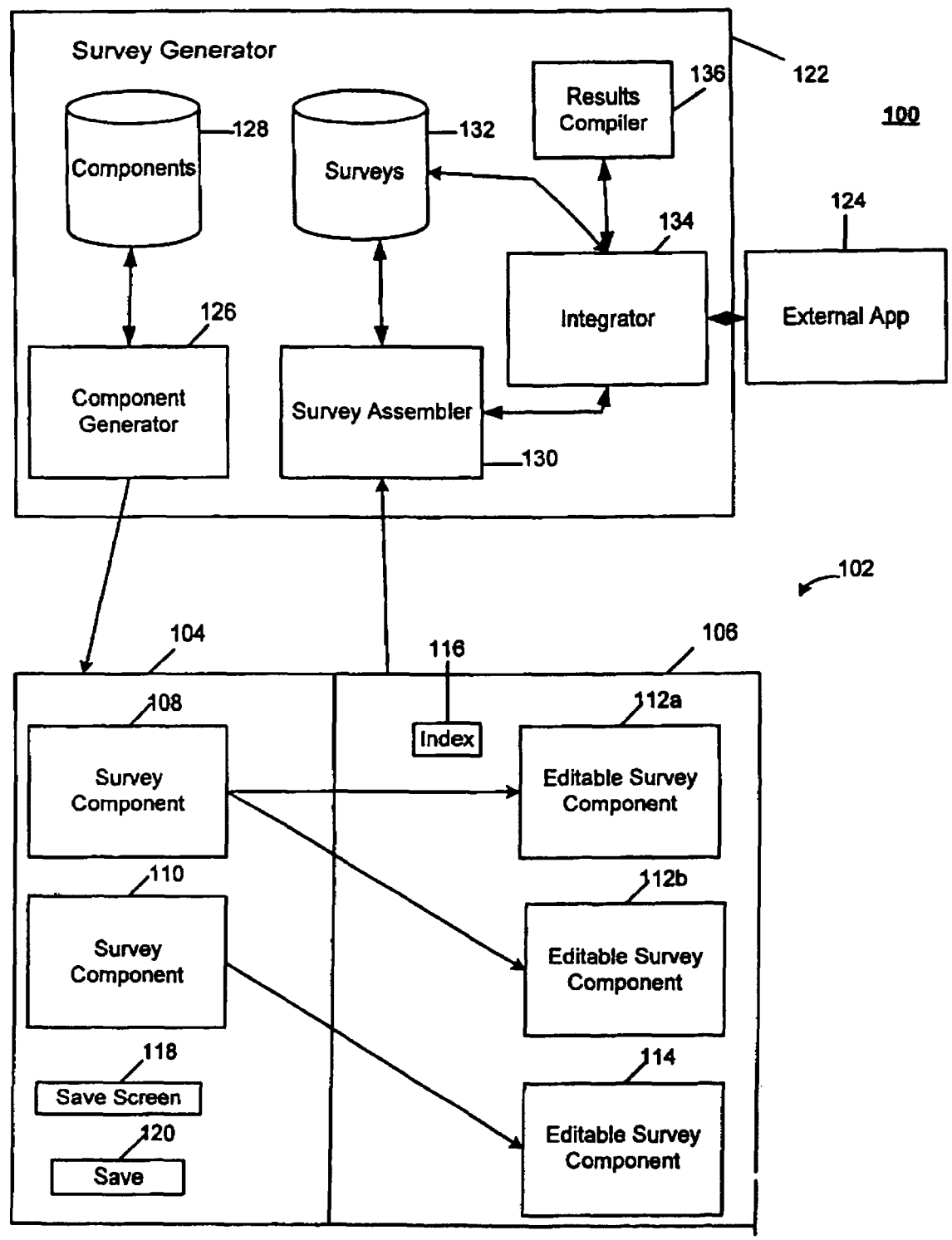
FIG. 1 is a block diagram of a survey generation system.

FIG. 1 is a block diagram of a survey generation system 100. In FIG. 1, a user interface 102 allows a survey designer to create and edit a survey in a fast, convenient, and intuitive manner. Moreover, the interface 102 allows the survey designer to view the survey while it is being created, in essentially the same manner that the survey will be viewed by a recipient or participant in the survey. In this way, and in contrast to existing survey creation systems that compile a survey only after all of the survey questions have been selected by a designer, the user interface 102 facilitates an ability of the survey designer to obtain a desired type and quantity of feedback from participants in the survey.

The user interface 102 includes a first portion 104 (alternately referred to as a designer view 104), as well as a second portion 106 (alternately referred to as a participant view 106). The designer view 104 includes a plurality of survey components 108, 110. The survey components 108, 110 each represent a generic type or class of survey questions.

For example, the survey component 108 may be identified as a "multiple choice" type question, while the survey component 110 may be identified as a "true/false" type question. Of course, virtually any other question type may be used, e.g., rating scales, open-ended questions (i.e., text-input questions), or ranking questions (i.e., ranking an order of preference of items), to name but a few.

The survey designer may select one of the survey components 108, 110, for example, the survey component 108, to create a corresponding editable survey component 112a within the participant view 106. For example, if the survey component 108 is associated with multiple-choice type questions, then the editable survey component 112a may include an editable question field into which the survey designer may enter a multiple choice question, along with multiple, editable answer fields into which the survey designer may enter a desired list of answers to the multiple choice question.

Somewhat similarly, if the survey component 110 represents a true/false type survey question, then the survey designer may select the survey component 110 to obtain the editable survey component 114. Here, then, the editable survey component would contain an editable question field for entering a desired question, and the associated answer field may be non-editable, and may simply contain the two choices "true" and "false." Similar comments apply when the survey components 108, 110 correspond to other types of survey questions, i.e., generation of the editable survey components 112, 114 generally may include an editable question field and/or and editable answer field.

The survey designer may select a particular survey component more than once, if more than one instance of the corresponding question type is desired. For example, in the scenario above in which the survey component 108 is associated with a multiple-choice question type, the survey designer may select the survey component 108 a second time in order to create a second instance of an editable survey component 112b, i.e., a second multiple choice question. Of course, the editable survey component 112b would have its own editable question and answer fields, for editing by the survey designer.

In this way, the survey designer may quickly and easily populate the participant view 106 with desired survey questions of desired types. The survey designer may determine an appearance of a resulting survey by, for example, re-locating (or deleting) the editable survey components 112a, 112b, and/or 114 within the participant view 106. As noted above, the resulting appearance may closely mirror a view of the survey that will be experienced by the participant(s). In this way, the survey designer may obtain a desired result in a minimum of time, while obtaining a highly-customized and useful survey in a convenient and intuitive manner.

In one implementation, the survey designer may obtain the editable survey components 112a, 112b, 114 by "dragging-and-dropping" a selected, corresponding one of the generic survey components 108, 110. For example, if the survey designer wishes to include three multiple choice questions within a survey, then the survey designer may drag three instances of the survey component 108 to desired locations within the participant view 106, and may subsequently or concurrently edit the particular question/answer fields as desired.

In other implementations, however, the editable survey components 112a, 112b, and 114 may be obtained by other techniques. For example, the editable survey component 112a may be generated within a next-available space of the participant view 106, simply by clicking, double-clicking, or otherwise selecting the survey component 108.

Also, although the designer view 104 and the participant view 106 are illustrated in FIG. 1 as being two parts of a single screen or window, other implementations may include the two portions 104, 106 in separate screens/windows. For example, the designer view 104 may be illustrated in a toolbar that is not tied to a particular screen, and selection of one of the survey components 108, 110 within the toolbar may generate a corresponding editable instance of the relevant survey question type within the participant view 106. In these and other implementations, the participant view 106, as explained above, reflects the survey as the survey will or would appear to the participant(s), even as the survey is being designed and constructed by the survey designer (i.e., at each stage of design/construction).

As the survey designer designs the survey, it may be that the participant view 106 becomes full, and contains a maximum number of questions that may be displayed within the second portion 106. In some implementations, then, the participant view 106 may be extended by adding a scroll bar (not shown in FIG. 1), so that the survey designer, and, ultimately, the participant, may scroll through (and/or answer) each of the survey questions.

In some implementations, however, the survey designer may feel that such a long list of questions, and the associated scrolling that may be required for viewing, may be detrimental to the participation of the survey participant(s). For example, if a list of survey questions appears too long, the participant may become discouraged, and may abandon the survey, or may only partially complete the survey. Further, the survey designer may wish to group or categorize certain questions or question types (for example, may wish to include all multiple choice questions together on a particular screen, or may wish to include all questions about a particular topic on a particular screen).

Accordingly, the user interface 102 may include an index 116 that is associated with the particular set of questions (112a, 112b, and 114 in FIG. 1) on a particular page of the participant view 106. That is, for example, if the questions 112a, 112b, and 114 are on a first page of a multi-page survey, then the index 116 may be designated as "index 1," or "index 1 of 8."

As the survey designer assembles a completed page of edited instances of survey components, then, the survey designer may indicate such by selecting a "save screen" button 118. For example, selection of the save screen button 118 may designate an appropriate index number for the index 116, or may update content of a page that has previously been assigned an index number. Once the survey designer has completed an entire survey of edited instances of the survey components, the survey designer may select a save button 120 that saves (or updates a save) of the entire survey.

The various features of the user interface 102 discussed above may be provided by, or used in the context of, a survey generator 122. The survey generator 122 may be on-line, i.e., may be accessible to the survey designer over a public or private network, such as, for example, the Internet or an enterprise network, respectively. In this case, the survey designer may easily create surveys (or access saved surveys) from any networked computer. Of course, some or all of the survey generator 122 also may be stored locally to the survey designer and/or the user interface 102.

The survey generator 122 allows easy integration with an external software application 124. That is, for example, surveys created by the survey designer may easily be supplied to the external application 124 for the gathering of survey feedback information within the context of the external application 124, or about elements of the external application 124. In some cases, the survey generator 122 may be incorporated within the external application 124, for simultaneous deployment and use thereof. Specific examples of the external application 124 are discussed below, and, in particular, with respect to FIGS. 10-12.

Within the survey generator 122, a component generator 126 may be used to access a database 128 of stored/available components. For example, survey components may be stored as eXtensible Mark-up Language (XML) documents, and may be selected by the survey designer on an as-needed basis, or at the start of a survey design.

In some implementations, for example, the survey designer may initiate a session with the survey generator 122, and may initially not have any survey components 108, 110 within the designer view 104, or may have some default number/type of the survey components 108, 110. In these cases, the survey designer may select the types of survey components that he or she desires for a particular survey design project (e.g., using a menu of possible survey components, not illustrated), for display within the designer view 104.

In other cases, the component generator 126 may simply provide a defined list of survey components. In these cases, although the defined list may be relatively restrictive as compared to the entire universe of question types that exist and may be used, it should be understood that many survey designers may prefer simply to have such a defined list, so as, for example, to remove the step(s) of selecting survey components before beginning a survey design. As a result, an ease of use and intuitive nature of the user interface 102 may be increased.

Once the survey designer has designed a survey as described above, e.g., has defined a number of edited instances of the survey components 108, 110, and thereafter selected the save button 120, a survey assembler 130 may receive and compile or aggregate the edited instances, as, for example, an XML document that is stored in a surveys database 132. In this way, surveys may be stored for future use or updating, or for integration with the external application 124.

In the latter case, an integrator 134 may be used to facilitate inclusion of the survey(s) with the external application 124. The integrator 134 may access the surveys within the database 132, or may receive a completed survey directly from the survey assembler 130. The integrator 134 may thus represent, for example, and interface between the survey generator 122 and the external application 124.

Finally in FIG. 1, a results compiler 136 may be used to receive and compile results from survey participants. For example, the results compiler 136 may receive the results (e.g., filled-in surveys) directly from the participants, or by way of the external application 124 and/or integrator 134. The results compiler 136 may, for example, determine a number or percentage of participants who provided a certain answer to a multiple choice question, or may compile results to a particular (open-ended) text input question together, for easy review by the survey designer. Other results compilation techniques also may be used, and, additionally or alternatively, additional results analysis may be performed within the context of the external application 124, or otherwise externally to the survey generator 122.

Figure 2:
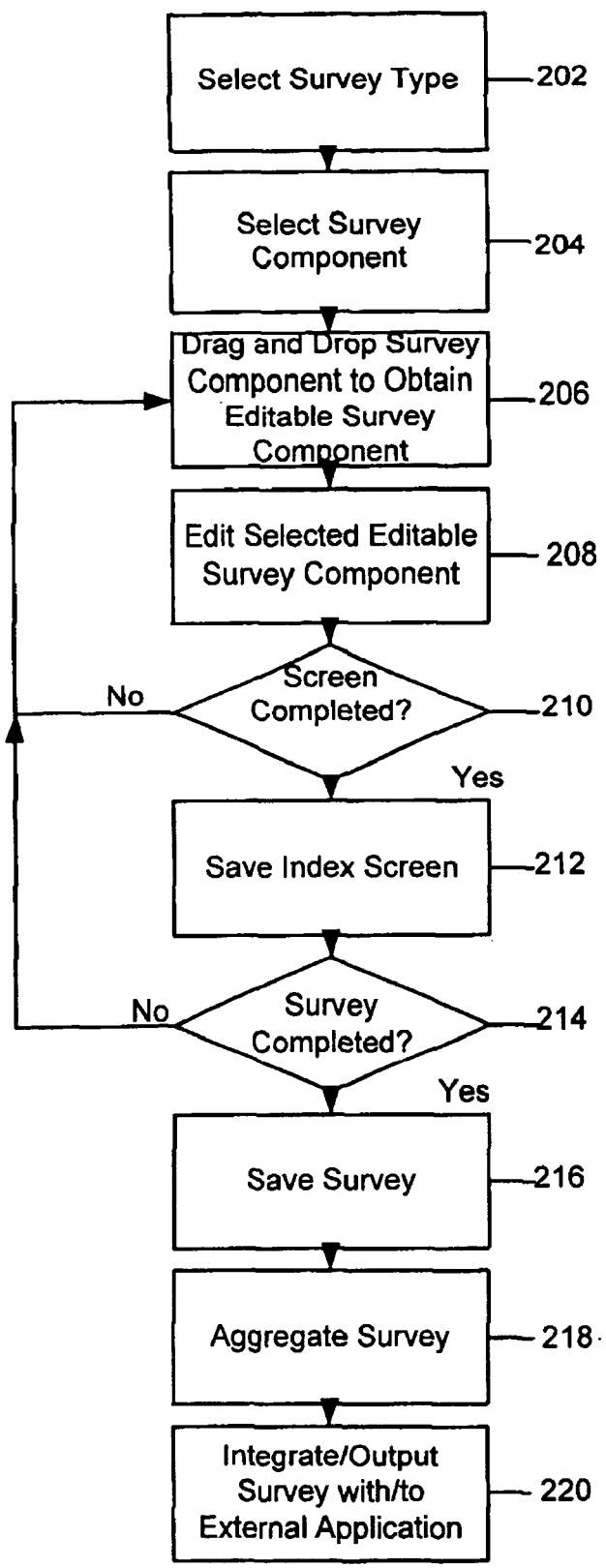
FIG. 2 is a flowchart illustrating an operation of the survey generation system of FIG. 1.

FIG. 2 is a flowchart 200 illustrating an operation of the survey generation system of FIG. 1. In FIG. 2, a survey designer may begin by selecting a survey type (202) that he or she wishes to design. For example, there may be a plurality of survey types, each associated with a pre-defined set of survey question type(s) and corresponding component. In some implementations, such selection of survey types may be omitted, and the survey designer may be presented with a standard selection of survey components.

In either case, the survey designer proceeds to select one of the survey components (204. The survey designer may then drag-and-drop, or otherwise obtain, an editable instance of the selected survey component (206).

The survey designer may then proceed to edit the editable instances of the survey components (208), thereby to obtain edited instances of the survey components. Such editing may include, for example, inputting a question and/or answer(s) into the editable survey component, or may include arranging or re-arranging the editable/edited survey components within a user interface. As discussed above, the ability of the survey designer to view a survey being designed in the same manner as will (or would) a survey participant serves to increase the odds that the resulting survey will match an expectation of the survey designer, with respect to both the appearance and the results of the survey.

If a currently-viewed screen is not yet full of editable and/or edited instances of the survey components (210), then the survey designer may continue adding editable instances of the survey components (206). Otherwise, the survey designer may save and/or index the screen (212).

If the survey is not complete at this point (214), then the survey designer may continue adding editable instances of survey components (206). Otherwise, if the survey is complete, then the survey designer may save the survey in its entirety (216).

At this point, the survey may be aggregated and saved (216), perhaps as an XML document. Finally in FIG. 2, the completed survey may be output either to a participant or to an external application.

Figure 3:
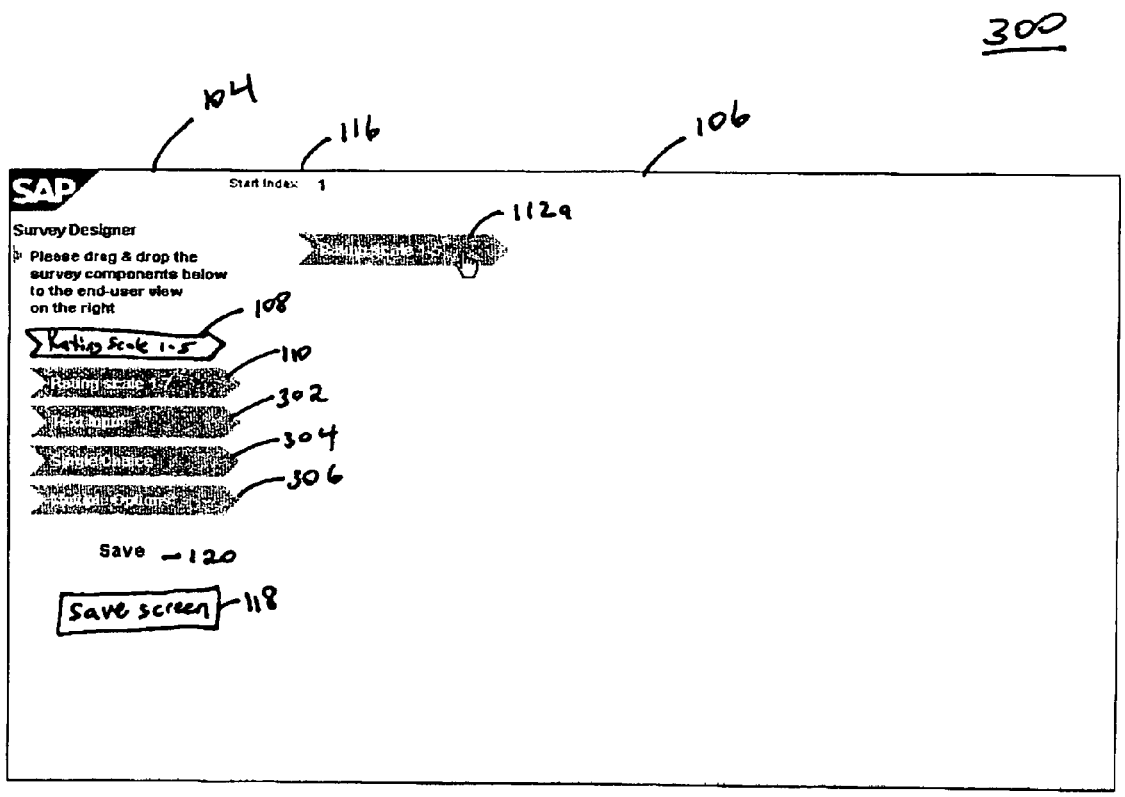
FIGS. 3-5 are screenshots seen by a survey designer while designing a first survey using the survey generation system of FIG. 1.
Figure 4:
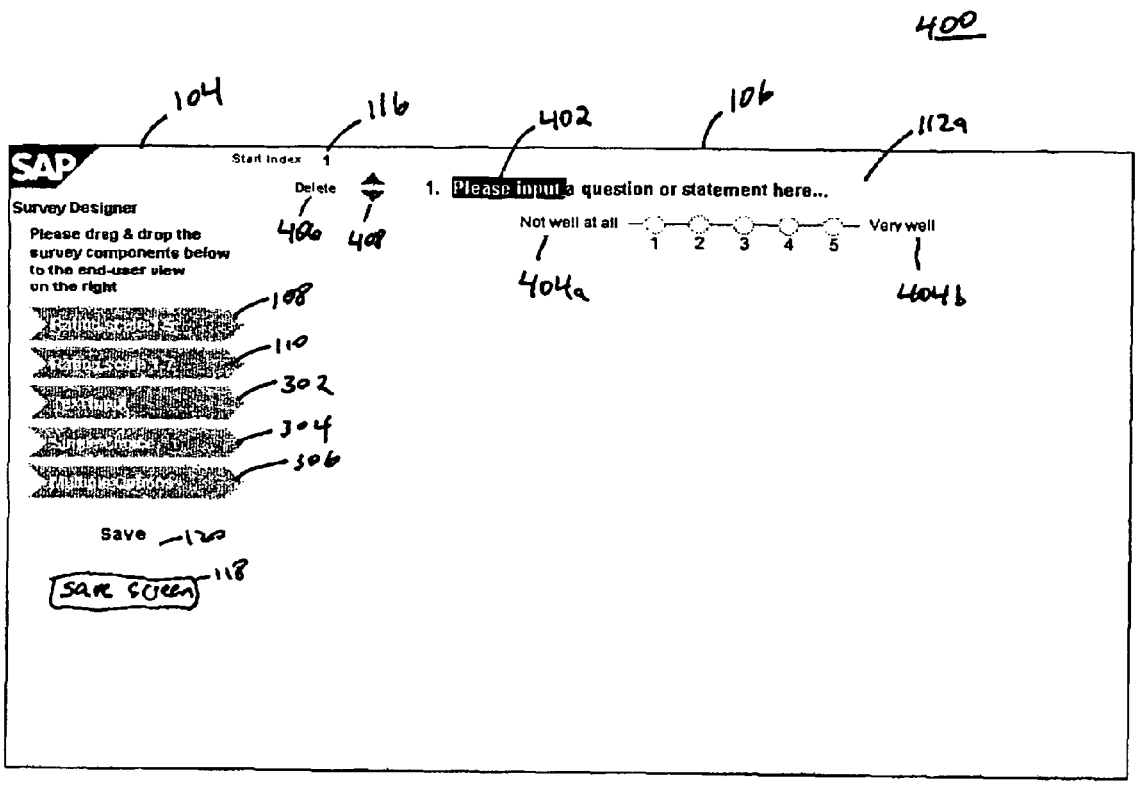
Figure 5:
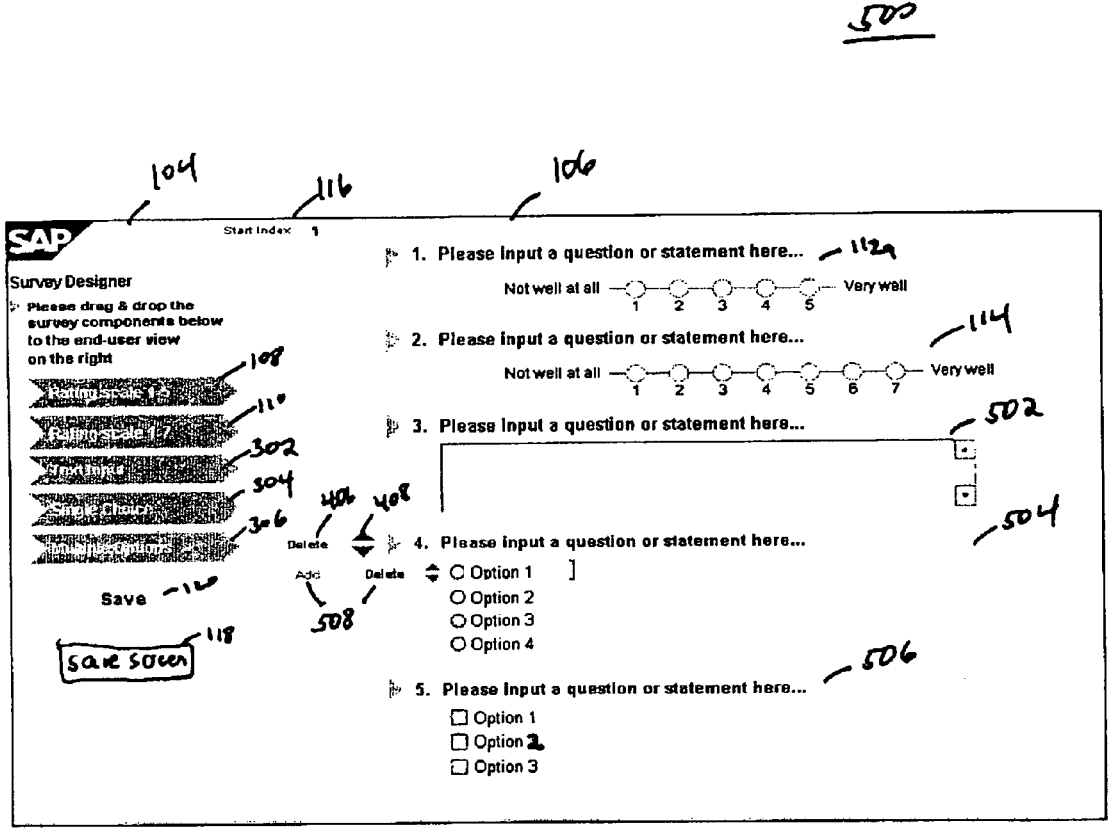

FIGS. 3-5 are screenshots seen by a survey designer while designing a first survey using the survey generation system 100 of FIG. 1. In FIG. 3, a screenshot 300 illustrates the designer view 104 and the participant view 106.

The survey components 108 and 110 within the designer view 104 are illustrated as "rating scale 1-5" and "rating scale 1-7," respectively. Additional survey components 302, 304, and 306 are illustrated as "text input," "multiple choice," and "single choice" question types, respectively. In the example of FIG. 3, then, the editable survey component 112a generated (e.g., dragged-and-dropped) from the survey component 108 provides an opportunity to edit a survey question type for ranking something on a scale of 1-5.

Specifically, as shown in a screenshot 400 of FIG. 4, the editable survey component 112a includes a question field 402 into which the survey designer may input a desired question. Further, answer fields 404a and 404b may be included that may or may not be editable by the survey designer. For example, the survey designer may change the answer fields 404a, 404b from "not well at all"/"very well," to "disagree strongly/agree strongly," or some other pair of extreme ranking(s).

For further editing of the editable instance 112a of the survey component 108, a delete button 406 may be included. As should be apparent, the delete button 406 allows the survey designer to remove the editable instance 112a, if, for example, the survey designer decides not to include the instance 112a.

Finally in FIG. 4, arrows 408 allow the survey designer to move the editable instance 112a up or down within the plurality of questions that ultimately populate the participant view 106. Other techniques also may be used to move the editable instance 112a within the plurality of questions; for example, the editable instance 112a may be selected, dragged, and dropped to a new location within the plurality of questions.

In FIG. 5, a screenshot 500 illustrates a full screen portion) 106 of editable instances of survey components. In FIG. 5, the editable survey component 114 of FIG. 1 corresponds to the survey component 110, and, in this case, is represented as a "rating scale 1-7" question type. Then, as shown, an editable instance 502 of the survey component 302 provides space for a text input or open-ended response, while editable instances 504 and 506 are each generated from the multiple options survey component 306.

Further in FIG. 5, and in addition to the delete button 406 and the arrows 408 discussed above, add/delete buttons 508 are included to allow the survey designer to add or remove answer choices from the editable instance 504. That is, while the buttons 406, 408 allow the survey designer to move the editable instance 504 within and among the editable instances 112a, 114, 502, and 506, the buttons 508 allow the survey designer to add or remove specific answer choices within the particular editable instance 504. As a result, although the editable instances 504 and 506 both are obtained from the same survey component 306, the instance 504 includes four answer options, while the instance 506 includes only three.

FIG. 6 is a screenshot 600 of a coded document 602 for displaying the survey of FIGS. 3-5. Specifically, in FIG. 6, the coded document is generated in XML format, for easy integration with the external application 124, upon selection of the save button 120.

Figure 7:
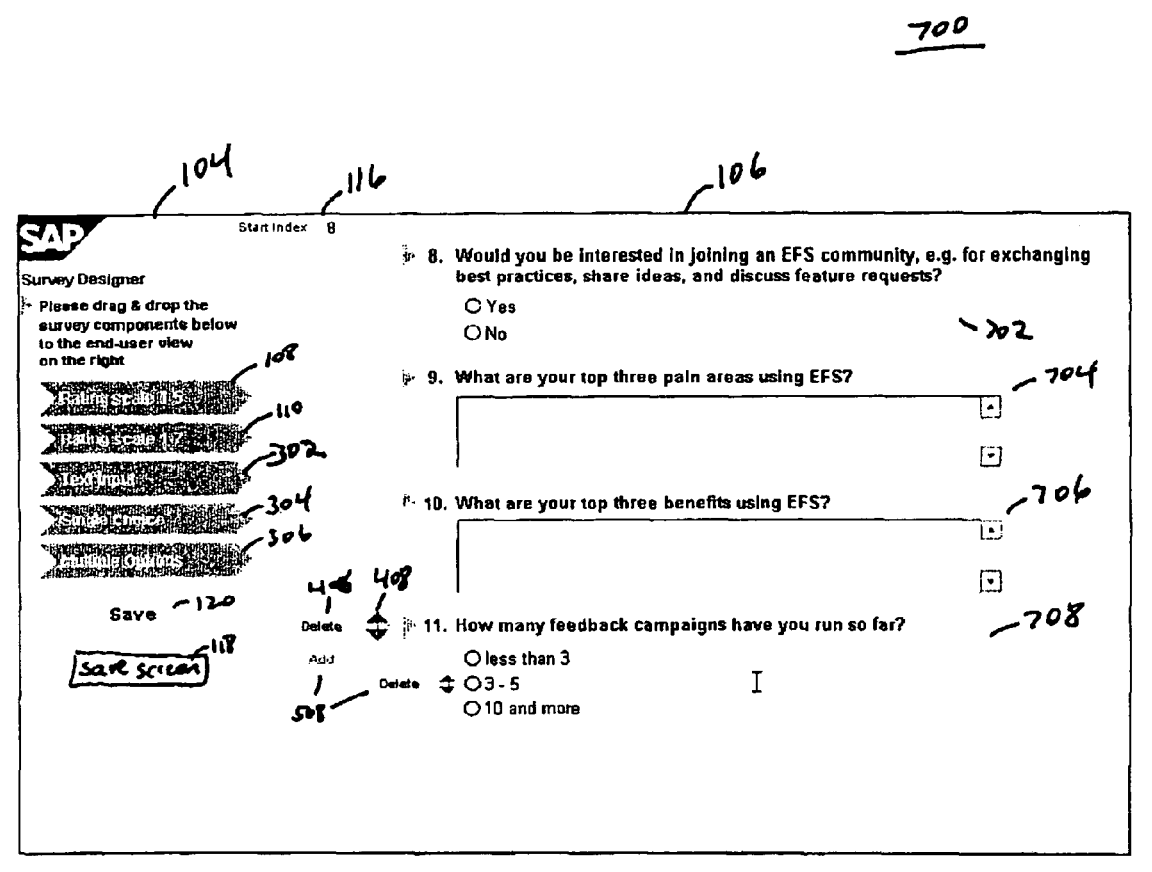

FIG. 7 is a screenshot seen by a survey designer while designing a second survey (or a further part of the same survey as FIGS. 3-6) using the survey generation system of FIG. 1. In FIG. 7, selected, editable instances of survey components have been fully edited to result in edited instances of survey components 702, 704, 706, and 708. As in FIGS. 4 and 5, buttons 406 and 508, as well as arrows 408, allow the survey designer to arrange or otherwise edit the survey component 508.

FIG. 8, similarly to FIG. 6, is a screenshot 800 of a coded document 802 for displaying the survey of FIG. 7, and, in particular, is illustrated as being coded in XML format. This coded document 802 is thus easily integrated with the external application 124, or otherwise output to a survey participant(s) for viewing as shown in a screenshot 900 of FIG. 9.

As previously discussed, the screenshot 900 resembles the participant view 106 of the screenshot 700, so that the survey designer's expectation for an appearance of the survey questions is matched. In FIG. 9, however, the screenshot 900 includes a submit button 902 that allows the survey participant to signify completion of the survey and to report results of the survey to the results compiler 136 or similar component. Also in FIG. 9, the screenshot 900 does not include the index buttons 116; however, the index buttons 116 may be displayed, and/or other techniques may be implemented for indexing and/or navigating the pages of the survey, as discussed in more detail below.

Figure 10:
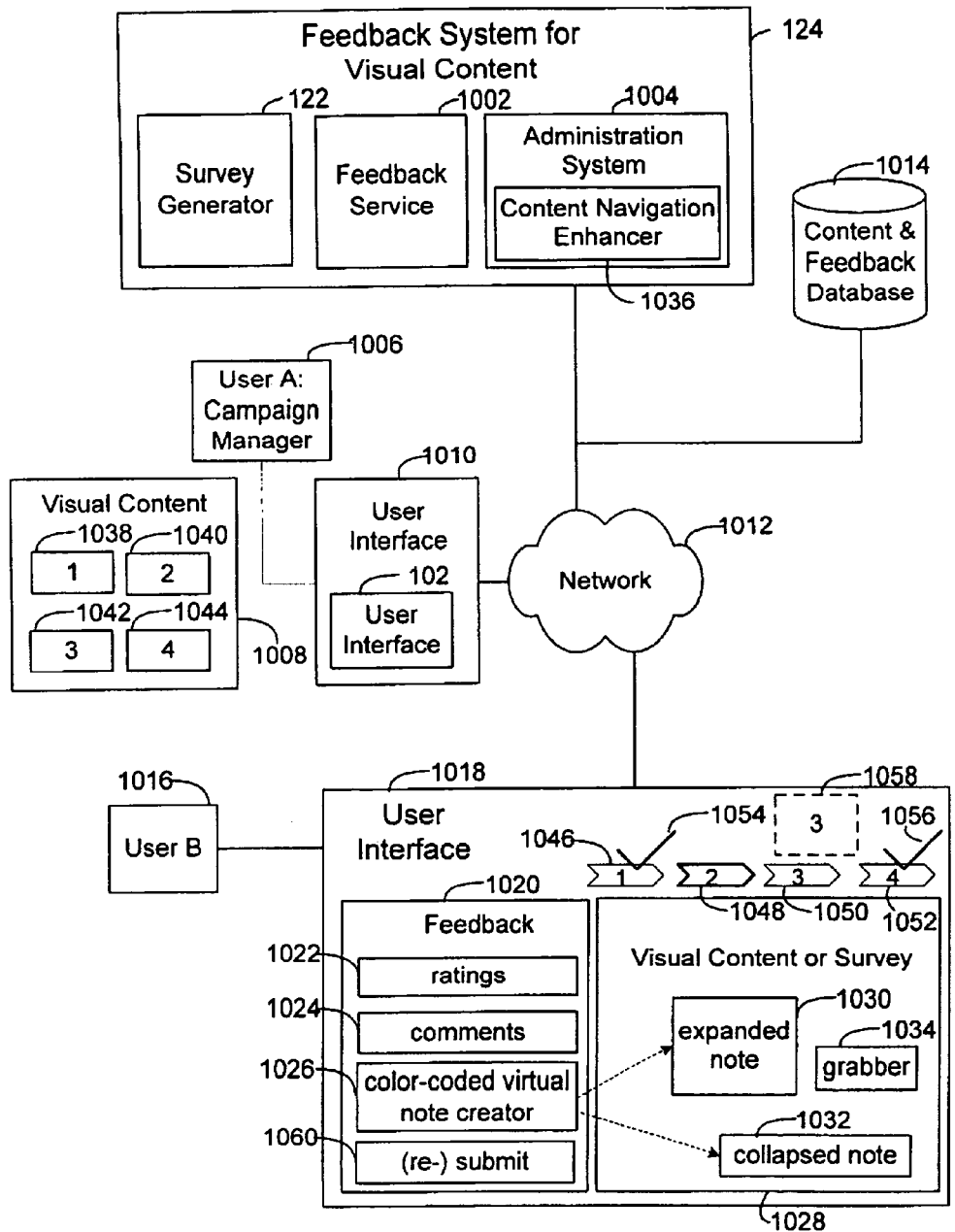
FIG. 10 is a block diagram of a user feedback service used for providing the survey of FIG. 7.

FIG. 10 is a block diagram of a user feedback service used for providing the survey of FIG. 7. That is, in FIG. 10, the external application 124 of FIG. 1 is illustrated as a feedback system for visual content, which is described in more detail below.

In FIG. 10, the system 124 includes a feedback service 1002 for obtaining feedback from users, and an administration system 1004 for allowing a managing user (e.g., a survey designer) to create and oversee a particular campaign for feedback regarding one or more pieces of visual content.

In particular, in FIG. 1, a user A 1006 is a "campaign manager" for a feedback campaign regarding visual content, who has created or otherwise obtained a piece or pieces of visual content 1008, and who wishes to conduct a campaign to obtain feedback from other users regarding the visual content 1008. Accordingly, this campaign manager 1006 uses a local user interface 1010 to access a network 1012. The intranet 114 may represent, for example, an enterprise-wide network, or any other type of private or semi-private computer network. As another example, the network 1012 may represent a publicly-available network, such as the Internet.

The campaign manager 1006 accesses a user registration service to register as a campaign manager and gain eligibility to use the feedback system 124. For example, the campaign manager may select a username and password, and receive permission to create and operate one or more campaigns for obtaining feedback.

Once the campaign manager 1006 is registered, the campaign manager 1006 accesses a campaign tracking system to define at least an initial campaign. That is, the campaign manager 1006 may define a name, duration, visual content nature, or other characteristic of the feedback campaign to be conducted. In this way, the feedback system 124 creates a feedback campaign that is specific to the campaign manager 1006, and to particular pieces of visual content 1008, so that future feedback may be tracked and managed accordingly.

The campaign manager 1006 also may access a feedback definition manager within the feedback service 124, with which the campaign manager 1006 may provide comments about the relevant visual content, and/or define the type of feedback that is being sought. For example, a pre-determined list of feedback questions may exist, from which the campaign manager 1006 may select for inclusion in the particular campaign being conducted.

The campaign manager 1006 may then upload the visual content to the feedback system 124, using an upload functionality of the user interface 1010. In one implementation, a content receiver provides a screen to the campaign manager 1006, where the campaign manager 1006 may simply "drag and drop" a locally-saved piece of visual content 1008 to the screen. The content receiver may operate in conjunction with the campaign tracking system to ensure that the visual content 108 is continuously and properly associated with its corresponding campaign.

In another implementation, software may be included locally to the campaign manager 1006 for uploading content in an easy, integrated manner. For example, a software application may be configured for convenient uploading of the visual content 1008 to the feedback system 124. In one implementation, the campaign manager 1006 may be viewing visual content anywhere on a local computer (e.g., scanned photographs, or a currently-viewed web site), and may simply hit an "upload" button (not shown), whereupon the campaign manager 1006 is immediately queried as to which campaign the visual content 1008 should be included. The upload button may be a standard keyboard key, such as, for example, the "printscreen" key, with appropriately-assigned functionality, or may be assigned to a right-button function of a standard mouse device.

Similar software is provided by Gadwin Systems, Inc., which produces a freeware "PrintScreen" product for screen capture. Such a product, or a similar product, may be used to integrate the inclusion of comments regarding the visual content when uploading. Other screen capture features may be used, separately or in conjunction with such software. For example, the uploading user 1006 may have an option to blur or obscure desired portions of the visual content, which may be confidential or irrelevant.

The content receiver may store the visual content 1008 in a database 1014. As discussed in more detail below, the database 1014 also may be used to store feedback information received from users, and also may be used by the campaign tracking system or other related systems to store campaign or other information, as needed. Of course, other/separate databases may be used for these purposes, and the database 1014 may be internal or external to the feedback system 124.

Once the visual content 1008 has been uploaded and stored in the context of a particular campaign, and the campaign manager 1006 has defined/included any comments or questions to be included with the visual content, a content provider makes the visual content and related information available to a defined pool of users. For example, the content provider may email a link to the users, with an invitation or instruction regarding the link. As another example, the content provider may include the visual content 1008 and related information within an email to the users.

In FIG. 10, the content provider provides the visual content 1008 and associated information to a user B 1016. The user B 1016 accesses a user interface 1018 that displays the visual content 1008 previously uploaded by the campaign manager 1006, as described above. The user interface 1018 also displays a feedback portion 1020, with which information from the campaign manager 1006 may be displayed, and feedback from the user B 1016 may be collected.

The feedback portion 1020 includes a ratings section 1022, a comments section 1024, and a color-coded virtual note creator 1026. The ratings section 1022 may include, for example, pre-defined questions with associated rating scales. For example, a question such as "what is your overall impression?" may be included with a selection scale of 1-5. Other questions or selection scales, previously determined by the campaign manager 1006 and/or the feedback system 124, also may be included.

Also in the ratings section 1022, rankings from the user B 1016 and other users may be automatically displayed, as the user B 1016 continues to provide feedback. For example, if the user B 1016 answers a question about a portion of the visual content 1008 by assigning a ranking to that portion, then, upon submission of the ranking, the rankings section 1022 may display a cumulative ranking of the visual content portion, so that the user B 1016 may receive information about feedback provided by other users.

The comments section 1024 may refer to comments from the campaign manager 1006, which may be displayed beside the visual content 1008, or may be overlaid on a relevant portion of the visual content 1008. Additionally, or alternatively, the comments section 1024 may refer to an open interaction element which the user B 1016 may use to enter free-form text regarding feedback on the visual content 1008.

The color-coded virtual note creator 1026 refers to a functionality that allows the user B 1016 to provide pre-defined or free-form feedback regarding specific portions of the visual content 1008, as the visual content 1008 is displayed within a window 1028. That is, the user B 1016, by selecting the virtual note creator 1026, may generate a virtual note that the user B 1016 may then freely place anywhere within or around the visual content 1008. In this way, the user B 1016 may provide specific comment on a particular portion of the visual content 1008, without having to provide a written description of the particular portion of the visual content 1008 in order to give context to the comment(s).

As discussed in more detail below, virtual notes created with the virtual note creator 1026 may include, for example, a drop-down menu, ranking scale, or other pre-defined feedback type. The virtual note(s) also may include a box for allowing the user B 1016 to enter free-form text comments. In this way, feedback entered using the virtual note(s) may be tracked and used in different ways. For example, although the virtual note(s) may include the above-described options for enabling the user B 1016 to enter feedback, it is also possible that the virtual note(s) conveys information simply by its presence, without additional comment from the user B 1016. For example, the virtual note(s) may be a red or green dot, used to generally and quickly imply negative or positive feedback, respectively, with respect to the portion of the visual content 1008 where the dot(s) is placed.

More specifically, the color-coded virtual note creator 1026 generates virtual notes according to a pre-defined coloring scheme. For example, the user 1016 may select red virtual notes to provide negative or critical comments, white virtual notes to provide neutral comments, and green virtual notes to provide positive comments or praise. In this way, the campaign manager 1006, upon reviewing results of a particular feedback campaign, may easily obtain information regarding a general tone of the feedback, e.g., whether the feedback is positive, neutral, or negative, without reading any associated comments in detail.

Further, in FIG. 10, a virtual note 1030 is illustrated as an expanded virtual note 1030 that has been expanded by the user 1016 to enter or view comments contained therein, whereas a collapsed virtual note 1032 represents a virtual note that has been reduced in size to minimize its impact on a viewing area of the visual content within the window 1028. For example, the user 1016 may have previously placed the virtual note 1032, provided feedback therein (e.g., selected a rating and/or added comments to an associated comment box), and then closed or minimized the virtual note 1032. At any time later, the user 1016 may re-expand the virtual note 1032, in order to view its contents. Similarly, the virtual note 1028 may currently be expanded because the user 1016 is viewing or modifying the contents thereof.

An additional tool for providing feedback regarding the visual content within the window 1028 is a grabber tool 1034. The grabber tool 1034 refers to a tool for identifying or "grabbing" a particular portion of the visual content within the window 1028, and for moving the particular portion so as to provide an improved view of the portion, or adjacent portions, to the user 1016. For example, if the user 1016 is reviewing the visual content on a small screen (e.g., the screen of a mobile computing device), then the user 1016 may not be able to view the visual content within the window 1028 in its entirety, but may not wish to reduce a viewing size of the visual content 1028, and/or may not wish to change a display resolution of the mobile computing device. In this case, the user 1016 may use the grabber tool 1034 to selectively view desired portions of the visual content within the window 1028, in the size and resolution desired by the user 1016 and/or the campaign manager 1006.

Once the user 1016 has finished inputting feedback on the visual content 1008, a results receiver within the feedback service 104 receives the results and interacts with the campaign tracking system to ensure that the results are properly associated with their respective campaigns. Then, the results may be input to a results aggregator for accumulating information about the feedback, again with respect to a particular campaign.

For example, the results aggregator may determine a composite rating for any pre-defined feedback scales (e.g., may determine that users gave an overall average impression of 4 on a scale of 1 to 5). The results aggregator may accumulate such results from the virtual notes, and may aggregate the results across users, across different pieces/versions of visual content, or across different portions of the same visual content. In this way, information may be easily gleaned about problem areas experienced by users.

A results manager allows the campaign manager 1006 to manage the results as aggregated by the results aggregator. For example, the campaign manager 1006 may select different views or compilations of the same results, or may view results across different campaigns. The campaign manager 1006 also may use various other applications to view the results. For example, results data may be downloaded into an Excel worksheet, or a PowerPoint presentation. In the case of an Excel worksheet, locations of the virtual notes may be recorded as x/y coordinates defined with respect to the visual content.

In the above description, the feedback system 124 is illustrated as containing the feedback service 1002, which primarily relates to functionality that is typically common to all campaign managers, and the administration system 1004, which primarily relates to the experience of individual campaign managers as they define, track, and use one or more campaigns. However, this functionality is merely one example, and it should be understood that the above areas of functionality are not intended to be restrictive, and could be defined or operated in a different manner.

For example, the functionality of the results aggregator and the results manager may be implemented in either of the feedback service 1002 and/or the administration system 1004. As another example, some of the functionality of the feedback system 124 may be implemented locally by the campaign manager 1006. For example, the upload functionality associated with the content receiver and the upload button may be implemented locally.

Further in FIG. 10, a content navigation enhancer 1036 is illustrated that is designed to provide additional feedback options and control to the user 1016. More specifically, for example, the content navigation enhancer 1036 may be used when the visual content 1008 includes a plurality of pieces or types of visual content, and particularly when these pieces or types of visual content are related to one another.

For example, as shown in FIG. 10, the visual content 1008 may include a plurality of pieces of visual content, including visual content 1038, 1040, 1042, and 1044. In this case, the visual content 1038, 1040, 1042, and 1044 may represent, for example, a specific business process, workflow, or other progression of displays that may be desired by the campaign manager 1006.

An example of a business process may include a sequence of screens that a sales professional would encounter when entering an order for a customer. A workflow may include screens corresponding to specific steps involved with an automation of a business process, in which tasks are passed from one participant to another toward the completion of a goal. An example of visual content used for implementing a workflow, therefore, may include screens used by a human resources manager(s) when processing a new hire, or screens used by customer service personnel in responding to customer requests, or various other types of workflow. As yet another example of related pieces of visual content, a marketing team may develop a series of advertisements that build upon one another to deliver a desired message or develop a desired theme.

In such examples of related pieces of visual content, and many other examples, the campaign manager 1006 may desire that the visual content 1038, 1040, 1042, and 1044 be considered as a whole, and/or that individual ones of the pieces of visual content 1038, 1040, 1042, and 1044 be considered in relation to one or more of the other pieces of the visual content 1038, 1040, 1042, and 1044. For example, the campaign manager 1006 may wish to know whether visual content that occurs later in a sequence is clear and meaningful in light of visual content that occurs earlier in the sequence. In this case, the user 1016 may not be able to make a meaningful judgment until both the earlier and later visual content have been viewed.

Somewhat similarly, the user 1016 may determine, while reviewing a latter part of a visual content sequence, that he or she has misunderstood the function or content of an earlier part of the sequence. In this case, the user 1016 may wish to return to the earlier part of the sequence, in order to determine, and comment on, the part of the sequence that was problematic.

In order to express relationships between, or sequences of, the visual content 1038, 1040, 1042, and 1044, the campaign manager 1006 may use an upload functionality of the user interface 1010 that includes an organizer function. For example, the organizer function may enable the campaign manager 1006 to establish an order for the visual content 1038, 1040, 1042, and 1044, for presenting to the user 1016. As a further example, the organizer function may allow the campaign manager 1006 to specify a first order for the visual content 1038, 1040, 1042, and 1044 with respect to a first target audience, and a different order for a second target audience. Somewhat similarly, the organizer function may allow the campaign manager 1006 to specify subsets of the visual content 1038, 1040, 1042, and 1044 that are to be sent to specific target audiences.

Thus, when the content navigation enhancer 1036 receives the visual content 1038, 1040, 1042, and 1044 from the user interface 1010, the content navigation enhancer 1036 has information regarding the desired sequence for the visual content 1038, 1040, 1042, and 1044. In some implementations, if no sequence is specified, then the content navigation enhancer 1036 may default to the assumption that the received order corresponds to a desired order. Using this information and/or assumption, the content navigation enhancer 1036 may operate on the visual content 1038, 1040, 1042, and 1044 to provide the user 1016 with the user interface 1018, which includes features provided by the content navigation enhancer 1036, as well as other features, as discussed in detail below.

In particular, the user interface 1018 includes identifiers 1046, 1048, 1050, and 1052, which correspond to the visual content 1038, 1040, 1042, and 1044, respectively. That is, for example, the identifier 1048 corresponds to the visual content 1040, so that, in FIG. 10, the identifier 1048 is highlighted, because the visual content 1040 is currently displayed within the user interface 1018. By selecting any one of the identifiers 1046, 1050, or 1052, the user 1016 may immediately view corresponding visual content 1038, 1042, and 1044, respectively. It should be understood that the identifiers 1046, 1048, 1050, and 1052, displayed in FIG. 10 as enumerated arrows, may be displayed using any conventional technique or component for representing an element of a user interface, such as, for example, a button, a symbol, an icon, a picture, or any other type of shape, character, or figure that may be used in constructing a user interface.

In this way, for example, and as referred to above, the user 1016 may progressively move through a sequence of the visual content 1038, 1040, 1042, and 1044, by sequentially selecting corresponding identifiers 1046, 1048, 1050, and 1052, respectively. In one implementation, each of the identifiers 1046, 1048, 1050, and 1052 may provide a link to its corresponding piece of visual content within the content and feedback database 1014. In another implementation, the visual content 1038, 1040, 1042, and 1044 may be temporarily stored or cached locally to the user 1016, so that the user 1016 may toggle back and forth between selected ones of the visual content 1038, 1040, 1042, and 1044 without having to request content from the feedback system 124 itself.

Thus, for example, the user 1016 may effectively have access to an overview of all of the visual content 1038, 1040, 1042, and 1044, and may be informed as to a desired order of review thereof. Accordingly, the user 1016 need not actually review (or provide feedback on) the visual content 1038, 1040, 1042, and 1044 in the order specified, but may review some or all of the visual content 1038, 1040, 1042, and 1044 before providing feedback.

For example, the user 1016 may first review and provide feedback on the visual content 1038 (associated with the identifier 1046), and may then jump directly to the visual content 1044 (associated with the identifier 1052) to review and provide feedback, before arriving at the view of visual content 1048 shown in FIG. 10. In FIG. 10, the fact that the user 1016 has already reviewed the visual content 1038 and 1044 is indicated by check marks 1054 and 1056 next to corresponding identifiers 1046 and 1052, respectively. In this way, the user 1016 may easily keep track of his or her progress in providing feedback, and have an accurate and real-time update as to how much additional feedback is required. As a result, the user 1016 may immediately be aware of a completion of the feedback process, since, in that case, all of the identifiers 1046, 1048, 1050, and 1052 may be checked as having been completed.

Some feedback campaigns may feature a relatively large number of screens of visual content, e.g., twenty, thirty, or more, screens of visual content. If identifiers in such instances were maintained at the same relative size as the identifiers 1046, 1048, 1050, and 1052 in FIG. 10, then, in some implementations, the user 1016 may need to perform horizontal scrolling within the user interface 1018, in order to select or view a particular identifier. In other implementations, in order to further facilitate navigation by the user 1016, the visual content identifiers may be scaled (e.g., horizontally scaled, by limiting a width of each identifier with respect to a visible width of the user interface 1018), within the user interface 1018, such that all of the identifiers are constantly visible within the user interface 1018. In this way, the user 1016 may avoid the need to scroll through the user interface 1018, in order to select or view visual content.

As a further aid to the user 1016, a thumbnail picture 1058 may be provided in association with the visual content 1042 and its associated identifier 1050. For example, as the user 1016 views the visual content 1040, the user 1016 may wish to know information about the visual content 1042. To view the visual content 1042, and as just described, the user 1016 may select the identifier 1050 and view the visual content 1042 in its entirety.

However, the user 1016 may not immediately remember which of the identifiers 1046, 1050, or 1052 corresponds to the visual content 1042, and may have to toggle through all of the visual content 1038, 1042, and 1044 to locate the desired visual content. Or, even if the user 1016 knows that the identifier 1050 corresponds to the visual content 1042, the user 1016 may not wish to navigate to the visual content 1042 in its entirety. Rather, for example, the user 1016 may simply wish to know general information about the visual content 1042, so as to, for example, refer to the visual content 1042 within the context of feedback provided with respect to the visual content 1040.

In these and other scenarios, the user 1016 may view or locate a particular piece of visual content simply by hovering over a selected one of the identifiers 1046, 1050, or 1052, and may thereby activate a corresponding thumbnail picture, such as the thumbnail picture 1058. The thumbnail picture 1058 may include, for example, general information about the visual content 1042, such as its title or subject matter, or the campaign(s) of which it is a part. Alternatively, or additionally, the thumbnail picture also may include some or all of an actual representation of the visual content 1042.

Also in FIG. 10, a submit/re-submit button 1060 is illustrated, which may be used by the user 1016 to submit feedback, or to submit revised feedback. For example, the user 1016 may have already provided feedback with respect to the visual content 1038 and the visual content 1044 (as indicated by the check marks 1054 and 1056, respectively), and is currently viewing the visual content 1040.

After the user 1016 is finished providing feedback regarding the visual content 1040, the user may select the submit button 1060, in order to indicate this completion of feedback. At this point, the feedback for the visual content 1040 is collected at the system 124 and stored in the database 1016, the content navigation enhancer 1036 may then provide a check mark next to the identifier 1048, and the submit button 1060 may be re-labeled with the name "re-submit."

In some implementations, it may not be necessary for the user 1016 to select the (re)submit button 1060. For example, if the user 1016 submits feedback regarding the visual content 1040, and then selects the identifier 1050 to view the visual content 1042, then the user 1016 may forget to select the submit button 1060 before moving on. In such cases, the feedback regarding the visual content 1040 may automatically be submitted (and the submit button 1060 re-labeled as "re-submit"), by virtue of the user 1016 navigating to the different screen, without the user 1016 having selected the submit button 1060.

In any of these scenarios, it may occur that the user 1016 decides to return to the visual content 1038 (by selecting the identifier 1046), in order, for example, to modify whatever feedback was previously submitted. In such cases, the user 1016 may simply, and then click the re-submit button 1060. In this way, the user 1016 may modify previously-submitted feedback, which may occur, for example, when the user 1016 changes his or her mind about an earlier piece of visual content, after viewing a piece of visual content that is later in a sequence.

Although the content navigation enhancer 1036 is discussed above in the context of related visual content, it should be understood that the content navigation enhancer 1036 may be used even when the visual content 1038, 1040, 1042, and 1044 does not represent any particular sequence or flow of information. For example, even if the visual content 1038, 1040, 1042, and 1044 represents four unrelated pieces of visual content that have been assembled by the campaign manager 1006, the user 1016 still may benefit from the various features described above.

In particular, whether the visual content 1008 is intra-related or not, the user 1016 may benefit from the various features when the visual content 1008 includes a relatively large number of individual pieces of visual content. For example, the user 1016 may benefit from the ability to quickly locate a desired piece of visual content from among the large number of individual pieces of visual content, using the identifier(s) and/or thumbnail picture(s) described above.

Based on the above, it should be understood that the content navigation enhancer 1036 provides the user 1016 with control, flexibility, and convenience when the user 1016 is reviewing visual content and providing feedback thereon. By providing identifiers that are associated with respective pieces of visual content within a campaign, the content navigation enhancer provides the user 1016 with an ordered overview of the campaign, and allows the user easily to select and/or view particular visual content, and to determine whether feedback for the particular visual content has already been submitted. Based on the above, it should be apparent that the user 1016 may easily view and provide feedback on a plurality of pieces of visual content. In providing the feedback on any particular visual content, the user 1016 may make use of some or all of a variety of feedback techniques. For example, the user 1016 may provide numerical ratings in the section 1022, and/or may provide comments in the section 1024.

In FIG. 10, it should be understood that the feedback system 124 provides a quick and easy method for internal and external end-users to provide feedback on visual content, including, for example, current or upcoming user interface designs. Individual users can self-register, create, manage, and analyze feedback campaigns. Internal and external users can rate, comment, and attach virtual notes to the visual content, and results of the feedback are immediately available to the initiating end-user. Moreover, as the user 1016 rates a first piece of visual content (or portion thereof) and views a second piece of visual content, results of feedback for the first piece of visual content may be instantly displayed to the user 1016. That is, the user 1016 may see a compilation (e.g., average rating) for the first piece of visual content, including the feedback provided by the user 1016.

As a result, the initiating end-user (e.g., the campaign manager 1006) may feel empowered to shape his or her own work environment and business processes. Users expressing feedback feel that their opinion is desired and useful. An operator of the feedback system 124, e.g., an employer running the network 1012 as an enterprise-wide intranet, may benefit from motivating and enabling internal and external end-users to continually provide feedback concerning new screen designs or screen sequences, while incorporating end-user expertise, creativity, and intelligence into the design of user interfaces and other visual content. Additionally, such an employer may have system-wide administrative and reporting capabilities for managing use of the feedback system 124.

Having described the feedback system of FIG. 10 as an example of the external application 124 of FIG. 1, various techniques for incorporating the survey generation techniques of FIGS. 1-9 should be apparent. For example, in FIG. 10, the survey generator 122 is illustrated as being integrated with the feedback system 124. As such, the campaign manager 1006 (survey designer) may access the survey generator 122 at the same time as, for example, creating a campaign and uploading the visual content 1038, 1040, 1042, and 1044.

For example, the campaign manager 1006 may use the user interface 102 of FIG. 1 within the context of the campaign user interface 1010 to design and edit the survey, and may then upload the resulting survey with the visual content 1038, 1040, 1042, and 1044 for inclusion within a defined feedback campaign. In one implementation, the resulting survey may be placed as a final piece of visual content, i.e., may be the last item viewed by the user 1016 while providing feedback, so that the user 1016 may provide comprehensive feedback regarding the visual content 1038, 1040, 1042, and 1044, by way of the survey. In other implementations, multiple surveys may be designed, and individually included after a particular piece or pieces (i.e., subset) of the visual content 1038, 1040, 1042, and 1044.

As should be apparent from FIG. 10, the survey(s) may be considered to be a piece of visual content, in terms of how the survey is handled and managed within the feedback campaign. For example, the survey(s) may be assigned its own identifier, such as the identifiers 1046, 1048, 1050, or 1052, so that the user 1016 may navigate to and from the survey as easily as the user 1016 navigates to and from the visual content 1038, 1040, 1042, and 1044 itself. Further, the user 1016 may even use feedback tools, such as, for example, the feedback tools 1022, 1024, or 1026, to provide comment on the survey itself (e.g., to add a virtual note that indicates a lack of understanding of a particular survey question).

In other implementations, the survey generator 122 may be external to the feedback system 124. In this case, the survey generator 122 may be called by the campaign manager 1006 and/or by the feedback system 124 for use with a user feedback campaign, but also may be available to the campaign manager 1006 (or other external applications) for other uses of designed surveys.

Figure 11:
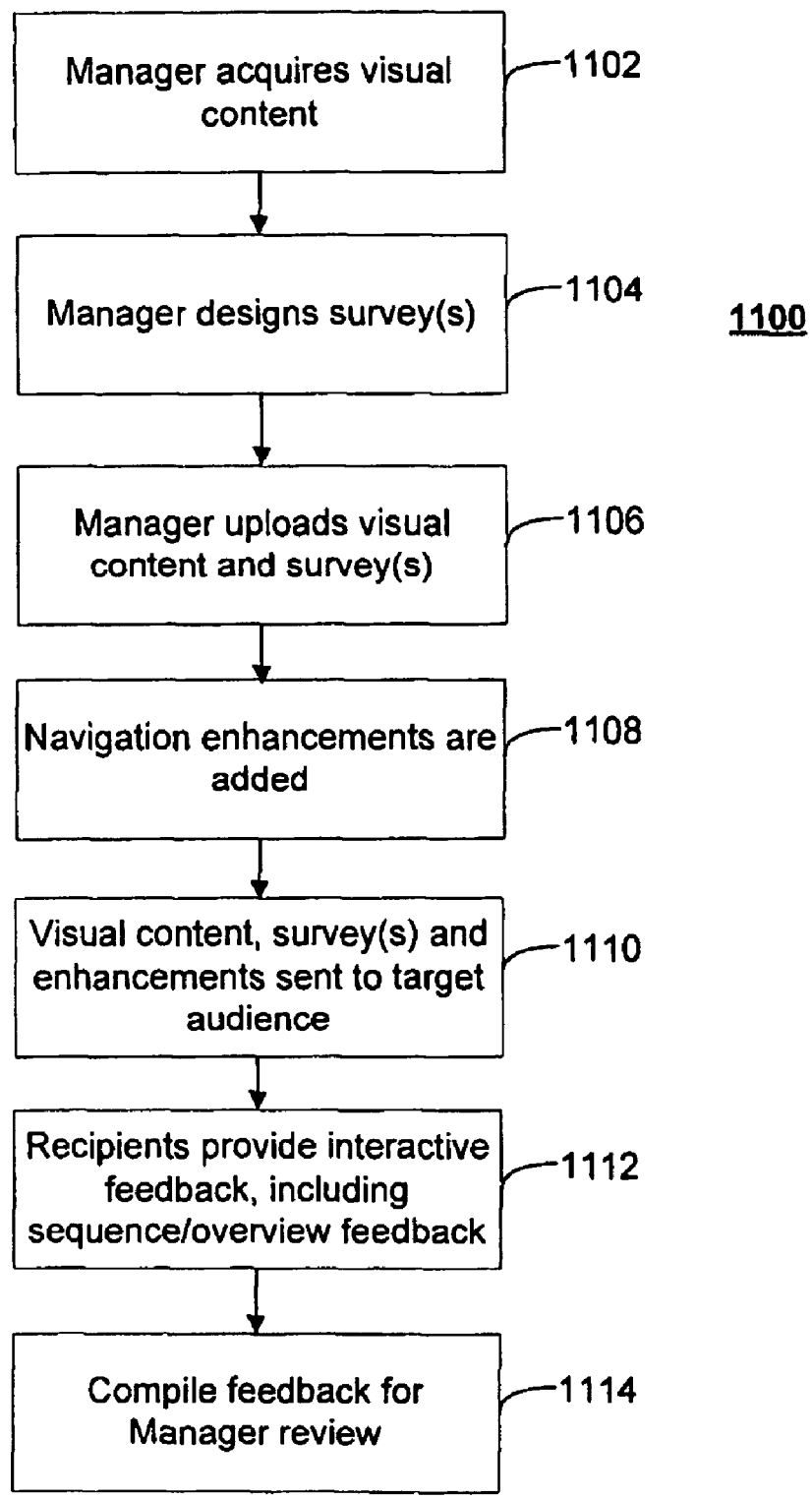
FIG. 11 is a flowchart of a process for using the user feedback service of FIG. 10 to provide the survey of FIG. 7.

FIG. 11 is a flowchart of a process for using the user feedback service of FIG. 10 to provide the survey of FIG. 7. In FIG. 11, the campaign manager 1006 acquires the visual content (1102), which may include pieces of visual content 1038, 1040, 1042, and 1044, where these pieces of visual content may or may not be related to one another in the context of, for example, a business process or workflow. The campaign manager 1006 defines characteristics for the particular campaign, and may use the organizer function described above to specify a flow or sequence of the pieces of visual content, perhaps with respect to a particular target audience(s).

The campaign manager 1006, subsequently or in conjunction with the acquisition of the visual content, may design a survey(s) for inclusion with the feedback campaign (1104). As explained above, the survey may be designed quickly and easily, and may display, during the design process, a view of the survey that will ultimately be seen by the user 1016 during the feedback campaign. Thus, the campaign manager 1006 increases the odds that the user 1016 will provide the type and quantity of survey feedback that is desired.

The campaign manager 1006 then uploads the visual content and survey(s) (1106). In some implementations, the campaign manager 1006 may upload the visual content, and then design the survey separately, for inclusion within the feedback campaign prior to distribution of the visual content to the user 1016 and other users.

The visual content and the survey are received at the feedback system 124, and the content navigation enhancer 1036 provides navigation enhancements to the visual content (1108). For example, as should be understood from the above discussion of FIG. 10, the content navigation enhancer 1036 may determine a desired flow or sequence of individual pieces of visual content that have been received, and may associate an identifier with each piece of visual content.

In this way, the content navigation enhancer 1036 may provide the identifier for each piece of visual content, and for the survey(s), in the determined order, within the context of the user interface 1018. As described, each identifier provided by the content navigation enhancer provides a link or pointer to the associated piece of visual content or survey, so that the user 1016 may easily locate and view a desired piece of visual content, and/or information about that visual content, and/or a desired survey.

Then, the visual content, survey(s), and navigational enhancements may be sent to a desired target audience (1110), so that the recipients within the target audience may provide feedback regarding the visual content. Since, as described, the identifiers and other navigational enhancements provide easy movement between the pieces of visual content and survey(s), information regarding an overview or flow of the visual content/survey, and status updates as to a completion state of the review process (among other features), the user 1016 and other members of the target audience are provided with an easy and interactive way to provide feedback regarding both individual pieces of visual content, and regarding the sequence of visual content, as a whole (1112).

As a result, the feedback system 124 may compile the provided feedback for review by the campaign manager 1006 (1114). Such compiled feedback may thus include feedback garnered through the use of the included survey(s), and may be compiled within a results compiler of the administration system 1004; and/or of the survey generator 122 itself. In this way, the campaign manager 1006 is likely to receive meaningful and concise feedback regarding the visual content within the campaign.

Figure 12:
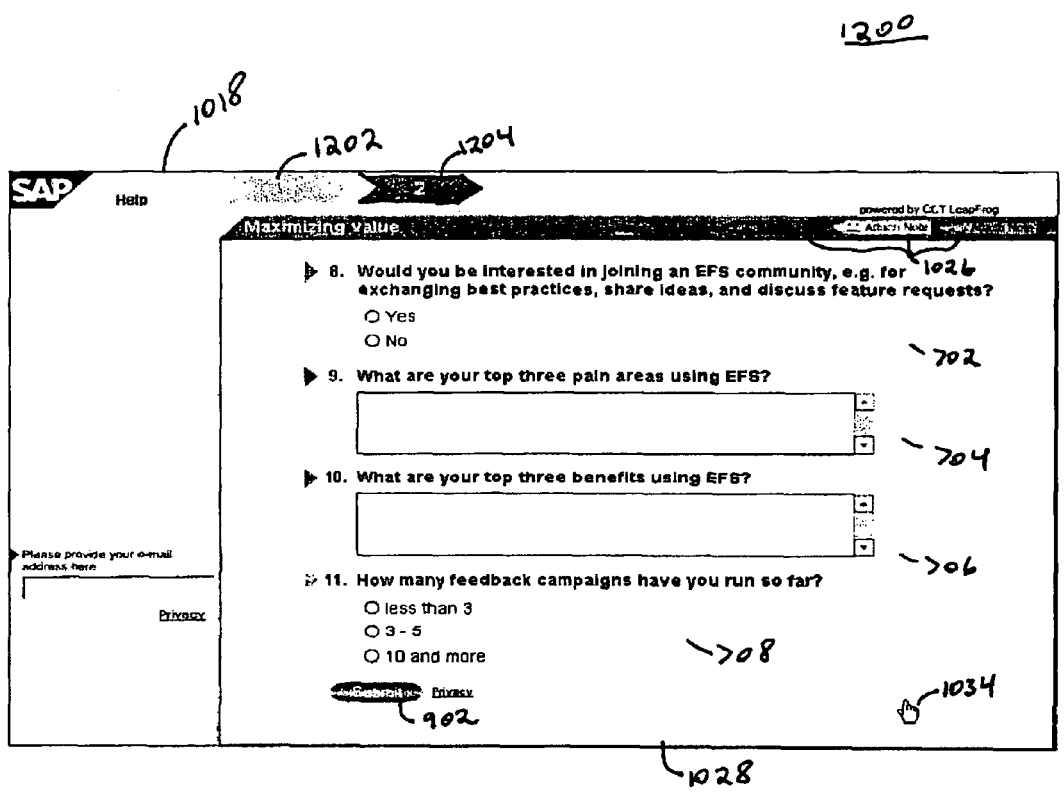
FIG. 12 is a screenshot of the survey of FIG. 7, as seen by a user of the user feedback service of FIG. 10.

FIG. 12 is a screenshot of the survey of FIG. 7, as seen by a user of the user feedback service of FIG. 10. In FIG. 12, survey questions 702, 704, 706, and 708 are displayed within the window 1028 of user interface 1018, as explained above with respect to FIG. 10. In particular, navigational identifiers 1202 and 1204 are included, which, as explained above with respect to identifiers 1046, 1048, 1050, and 1052, allow the user 1016 to navigate to/from the survey currently displayed within the window 1028 and associated with the (highlighted) identifier 1204. As a result, the user 1016 may provide feedback regarding individual pieces of visual content, but also may provide feedback by way of the survey illustrated in FIG. 12.

As described above, then, survey generation systems are provided that allow a survey designer to create a survey in a fast and intuitive way, using a "what you see is what you get (WYSIWYG)" fashion. The survey designer sees the survey as the survey is being constructed, and as the survey will ultimately appear to a survey participant. Moreover, the resulting survey (and/or the survey generation techniques) may easily be integrated with other software applications, so that the designed survey has a wide applicability of use.

A number of implementations have been described. Nevertheless, it will be understood that various modifications may be made. Accordingly, other implementations are within the scope of the following claims.

What is claimed is:

1. A computer system having stored thereon executable instructions that when executed by the computer system provide a survey generation system comprising:

a survey component generator tangibly implemented in the computer system and operable to provide multiple survey components for display within a designer view of a user interface for selection by a survey designer, and further operable to generate an editable instance of a plurality of survey components, for display and editing within a participant view of the user interface, wherein the survey designer selects each of the plurality of survey components and visually places the selected survey component in the participant view of the user interface in an order that the plurality of survey components will be presented on a first screen of a survey;

wherein the designer view includes first and second save functions, the first save function configured for: (i) saving the first screen including a plurality of editable or edited instances of the plurality of selected survey components located in the participant view and clearing the participant view, and (ii) saving a second screen upon another selection of the first save function after generation of the second screen to include a plurality of editable or edited instances of the plurality of survey components in the participant view, wherein each instance of the plurality of editable or edited instances of the first and second screens includes a question field and its corresponding answer field; and wherein the first and second screens include first and second index markers, respectively, indicating that the first screen is to be presented before the second screen in a sequence;

a survey assembler tangibly implemented in the computer system and operable to receive the plurality of editable or edited instances of the plurality of selected survey components displayed in the participant view of the user interface, for assembly into the survey for output to a survey participant, wherein the second save function is configured for causing the survey assembler to assemble the first screen and the second screen into the survey such that the first screen is presented before the second screen in the sequence and such that the plurality of instances of the plurality of selected survey components are presented in the order on the first screen.

2. The computer system of claim 1, wherein the designer view of the multiple survey components and the participant view of at least some of the editable or edited instances of the plurality of survey components are displayed to the survey designer simultaneously during a designing of the survey.

3. The computer system of claim 1, wherein the multiple survey components include drag-and-drop elements displayed within the designer view and the plurality of editable or edited instances include dragged-and-dropped instances of one or more of the survey components within the participant view.

4. The computer system of claim 1, wherein each of the plurality of survey components are identified within the designer view as corresponding to a survey question type, and wherein the plurality of editable survey components include an editable question or answer field that corresponds to the survey question type.

5. The computer system of claim 1, further comprising a results compiler that is operable to receive survey input from a plurality of survey participants for aggregation of the survey input.

6. The computer system of claim 1, wherein the survey component generator is operable to generate the plurality of survey components as extensible Mark-up Language (XML) components, and further wherein the survey assembler is operable to assemble, save, and output the survey as an XML document.

7. The computer system of claim 1, further comprising an integrator for supplying the survey to an external application, such that the survey may be supplied to users of the external application.

8. A method comprising:
displaying multiple survey components within a first portion of a user interface of a computer system;
receiving a selection of a plurality of the multiple survey components by a survey designer, the survey designer selecting each of the plurality of survey components and visually placing the selected survey component in a second portion of the user interface in an order that the plurality of survey components will be presented on a first screen of a survey;
displaying a plurality of editable instances of the plurality of selected survey components within the second portion of the user interface;
receiving edits to the plurality of editable instances of the plurality of survey components to obtain edited instances of the plurality of survey components, while displaying the multiple survey components within the first portion of the user interface;
in response to a first input generated using a first save function, saving the first screen including the plurality of editable or edited instances of the selected plurality of survey components having the order and located in the second portion, and clearing the second portion;
in response to a second input generated using the first save function, saving a second screen after generation of the second screen to include a plurality of editable or edited instances of the plurality of survey components in the second portion, wherein each instance of the plurality of editable or edited instances of the first and second screens includes a question field and its corresponding answer field; and wherein the first and second screens include first and second index markers, respectively, indicating that the first screen is to be presented before the second screen in a sequence; and
in response to a third input generated using a second save function, assembling the first screen and the second screen into the survey such that the first screen is presented before the second screen in the sequence and such that the plurality of instances of the plurality of selected survey components are presented in the order on the first screen.

9. The method of claim 8, wherein the receiving the selection and the displaying editable instances comprise providing a drag-and-drop functionality for the survey components such that the editable instances include dragged-and-dropped instances of one or more of the survey components.

10. The method of claim 8, further comprising outputting the survey to a user-feedback application, such that the survey designer may include the survey within a user-feedback campaign.

11. A user interface tangibly implemented in a computer system comprising a computer display device, the user interface comprising:
a first portion for displaying multiple survey components that are each associated with a type of survey question; and
a second portion for displaying editable instances of a plurality of selected a plurality of survey components for editing by a survey designer, to thereby obtain a multiple of survey questions, while the first portion is displaying the multiple survey components, the survey designer selecting each of the plurality of survey components and visually placing the selected survey component in a second portion of the user interface in an order that the plurality of survey components will be presented on a first screen of a survey;
wherein the first portion includes a first save function configured for: (i) saving the first screen including a plurality of editable or edited instances of the plurality of selected survey components located in the second portion and clearing the second portion, and (ii) saving a second screen upon another selection of the first save function after generation of the second screen to include a plurality of editable or edited instances of the selected plurality of survey components in the second portion, wherein each instance of the plurality of editable or edited instances of the first and second screens includes a question field and its corresponding answer field; and wherein the first and second screens include first and second index markers, respectively, indicating that the first screen is to be presented before the second screen in a sequence;

wherein the first portion includes a second save function configured for causing the first screen and the second screen to be assembled into the survey such that the first screen is presented before the second screen in the sequence and that the plurality of instances of the plurality of selected survey components are presented in the order on the first screen; and wherein the plurality of editable or edited instances are supplied and placed within the second portion by way of a dragging-and-dropping of the plurality of the survey components between the first portion and the second portion.

* * * * *